US005946519A

United States Patent [19]

Chao et al.

[11] Patent Number: 5,946,519

[45] Date of Patent: Aug. 31, 1999

[54] LIGHT SOURCE FOR FORMING PHOSPHOR ELEMENTS ON CRT DISPLAY SCREEN

[75] Inventors: Chih-Chien Chao, Taipei; Chun-Hsiung Yen, Taoyuan; Ying-Hung Chuang, Ping-Jan; Keh-Chung Su, Kaohsiung County, all of Taiwan

[73] Assignee: Chunghwa Picture Tubes, Ltd., Taoyuan, Taiwan

[21] Appl. No.: 08/912,626

[22] Filed: Aug. 18, 1997

[51] Int. Cl.[6] .............................. G03B 41/00; H01J 29/12

[52] U.S. Cl. .............................. 396/546; 313/465; 430/24

[58] Field of Search .................................... 396/546, 547; 313/465; 430/23, 24

[56] References Cited

U.S. PATENT DOCUMENTS 3,628,429 12/1971 Barten et al. ............................ 396/546
3,780,629 12/1973 Barten et al. ............................ 396/546
5,270,753 12/1993 Adler et al. ............................. 396/546

FOREIGN PATENT DOCUMENTS 2260351 10/1990 Japan .

*Primary Examiner*—Eddie C. Lee
*Assistant Examiner*—J. K. Han
*Attorney, Agent, or Firm*—Emrich & Dithmar

[57] ABSTRACT

Apparatus for use as a lighthouse in the manufacture of a color cathode ray tube (CRT) includes a housing with a cover lens. Disposed within the housing is a light source assembly including a light source in the form of a cylindrical shaped mercury lamp and an optical aperture closely spaced to the mercury lamp. The mercury lamp directs light through the optical aperture as well as through the cover lens onto the inner surface of the CRT's glass faceplate in a photo-stenciling process for registering, or aligning, phosphor dots on the faceplate's inner surface with electron beam passing apertures in the CRT's color selection electrode, or shadow mask. The optical aperture is elongated, with its longitudinal axis aligned generally transverse to the longitudinal axis of the mercury lamp, and is curvilinear having from two (2) to eight (8) inflection points along its length. The inflection points of the optical aperture, or the points along its length where it undergoes a slope reversal, direct the light beam through the shadow mask apertures and onto the CRT's faceplate in a manner which closely simulates electron beam trajectories under the influence of a self-convergent magnetic deflection yoke to correct for residual misregistration errors arising from the use of the self-convergent magnetic deflection yoke in the CRT. The unique shape of the optical aperture also reduces registration sensitivity of the light beam directed onto the faceplate, thus relaxing alignment tolerances and assembly precision of the light source and associated components.

5 Claims, 5 Drawing Sheets

LIGHT SOURCE FOR FORMING PHOSPHOR ELEMENTS ON CRT DISPLAY SCREEN

FIELD OF THE INVENTION

This invention relates generally to the manufacture of color cathode ray tubes (CRTs) and is particularly directed to a light source for use in forming a large number of phosphor dots on the inner surface of the CRT's glass faceplate in precise registration with electron beam passing apertures in the CRT's shadow mask.

BACKGROUND OF THE INVENTION

In a matrix screen color CRT, a large number of phosphor dots are formed on the inner surface of the CRT's glass display screen using photolithography. Trios of the phosphor dots, generally surrounded by a black matrix of non-luminescent material for improved contrast, provide the primary colors of red, green and blue when a raster-scanned electron beam is incident thereon. To ensure that the intended electron beam is incident upon only designated phosphor dots, an apertured color selection electrode, or shadow mask, is positioned between the electron beam source and the display screen, with the electron beams passing through the large number of apertures in the shadow mask before being incident upon the display screen's phosphor dots. Precise registration between shadow mask apertures and display phosphor dots is critical to ensure a high degree of brightness uniformity and color purity of a video image presented on the display screen.

In the photolithography process, a light source typically in the form of a high pressure, water cooled mercury lamp in combination with an optical aperture directs light through the shadow mask apertures onto the display screen's inner coated surface. In forming the phosphor dots on the display screen, it is important that the light directed through the shadow mask apertures closely simulate electron beam trajectories to ensure proper registration between each shadow mask aperture and its corresponding phosphor dots. It is also important for shadow mask aperture-phosphor dot registration that the light source appear as a point light source. The finite dimensions of the light source and the inability to closely approximate electron beam trajectories by the path of the light directed onto the display screen have given rise to residual misregistration errors between the shadow mask apertures and phosphor dots. In high resolution computer display CRTs, this residual misregistration is even greater than that in a conventional color television receiver CRT giving rise to even greater reductions in the levels of color purity and white uniformity on the computer display.

Referring to FIG. 1*a*, there is shown a simplified side elevation view of a typical prior art light source apparatus 10 used in the formation of phosphor dots on the inner surface of a display screen 34 of a color CRT. The light source apparatus 10 includes a housing 12 having an aperture through which light is directed from a light source 16. The light emanating from light source 16 is shown in simplified form as a pair of linear rays 24*a* and 24*b* directed through respective apertures in a shadow mask 36 positioned adjacent to the inner surface of the CRT display screen 34. Light rays 24*a*, 24*b* pass through the aforementioned aperture in an upper portion of housing 12, where the CRT display screen 34 is disposed over the aperture. Positioned within housing 12 is a lamp house 14 in which is disposed a light source 16 and a slot or gap disposed above the light source.

This latter structure is shown in greater detail in the perspective view of FIG. 1*b* which shows the linear, elongated, cylindrical shaped light source 16 disposed adjacent to first and second covers or shielding 18*a* and 18*b*. The first and second covers 18*a*, 18*b* form a generally semi-circular optical slot or aperture 20 therebetween for directing the light through a flat cover glass 22. Cover glass 22 is generally cylindrical in shape and is attached to lamp house 14 by means of an O-ring seal 28 in combination with a generally circular positioning bracket 26. After exiting lamp house 14 and transitting the flat cover glass 22, the light passes first through a trimmer 30 and thence through a correction lens 32 before passing through the apertures within shadow mask 36 and then onto the phosphor-bearing material on the inner surface of the display screen 34. As shown in the figures, the x-axis is horizontal and generally defined as coincident with the longitudinal axis of the cylindrical light source 16, the y-axis is horizontal and extends perpendicular to the longitudinal axis of the light source, and the z-axis passes through the light source and is oriented perpendicular to the plane defined by the x- and y-axes.

Various approaches have been adopted in attempting to improve shadow mask aperture-phosphor dot registration. One such prior approach is disclosed in Japanese Patent Document 2-260351 which employs an optical aperture having a general V-shaped cross section. The width of the aperture gradually narrows from its center to its sides to allegedly provide better grading of phosphor dot size. This optical aperture thus is intended to correct for phosphor dot size errors rather than for residual misregistration. Another approach is disclosed in U.S. Pat. No. 5,270,753 which employs an optical aperture generally parabolic in shape and constructed of a series of segments having dissimilar slopes to provide a slot which is not bilaterally symmetrical. This later approach, while somewhat correcting for residual misregistration exhibits high registration sensitivity, thus requiring precise optical alignment and mechanical assembly of the light source and associated components. These characteristics limit the commercial attractiveness of this approach.

The present invention addresses the aforementioned limitations of the prior art by providing a light source including a uniquely configured optical aperture which corrects over the entire area of the CRT's display screen for residual misregistratation errors arising from the effects of a self-convergent magnetic deflection yoke on the trajectories of the electron beams. The inventive light source also substantially reduces registration sensitivity of the light beam directed onto the display screen and relaxes tolerances in the mechanical assembly and alignment of the light source.

OBJECTS AND SUMMARY OF THE INVENTION

Accordingly, it is an object of the present invention to provide a light source for use in forming phosphor dots on the inner surface of the glass faceplate of a color CRT in a manner which provides a high degree of color purity and white uniformity in a video image formed on the faceplate.

It is another object of the present invention to provide an optical aperture for directing a light beam through a light source onto the display screen of a color CRT which affords precise registration between phosphor dots formed on the faceplate and electron beam passing apertures in the CRT's color selection electrode, or shadow mask.

Yet another object of the present invention is to provide an elongated, narrow, curvilinear optical aperture for use with a light source in a lighthouse assembly for the manufacture of a color CRT which reduces the registration sensitivity of phosphor deposits formed on the CRT's display screen with electron beam passing apertures in the CRT's shadow mask and relaxes tolerances in the mechanical assembly and alignment of the lighthouse assembly.

A further object of the present invention is to minimize electron beam landing errors on the display screen of a color CRT by using a light source in forming the electron beam-sensitive phosphor dots on the display screen which directs a light beam onto the phosphor dots in a manner which closely approximates the effects of the CRT's self-convergent magnetic deflection yoke on the electron beams swept over the display screen in a raster-like manner.

This invention contemplates apparatus for forming a matrix of phosphor elements on an inner surface of a display screen of a color cathode ray tube (CRT) having an apertured color selection electrode in closely spaced relation to the display screen, wherein a light sensitive material containing phosphor is disposed on the inner surface of the display screen, the apparatus comprising: an elongated, linear light source; and an apertured member having an elongated, curvilinear optical aperture with a longitudinal axis aligned generally transverse to the elongated, linear light source and disposed intermediate the light source and the display screen for directing light from the light source through apertures in the color selection electrode onto the light sensitive material on the display screen's inner surface, wherein the optical aperture has a plurality of inflection points disposed in a spaced manner along its length and wherein the inflection points are symmetrically disposed on either side of a point of closest approach of the aperture to the light source, with each inflection point defining a reversal in slope of the optical aperture.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1A:
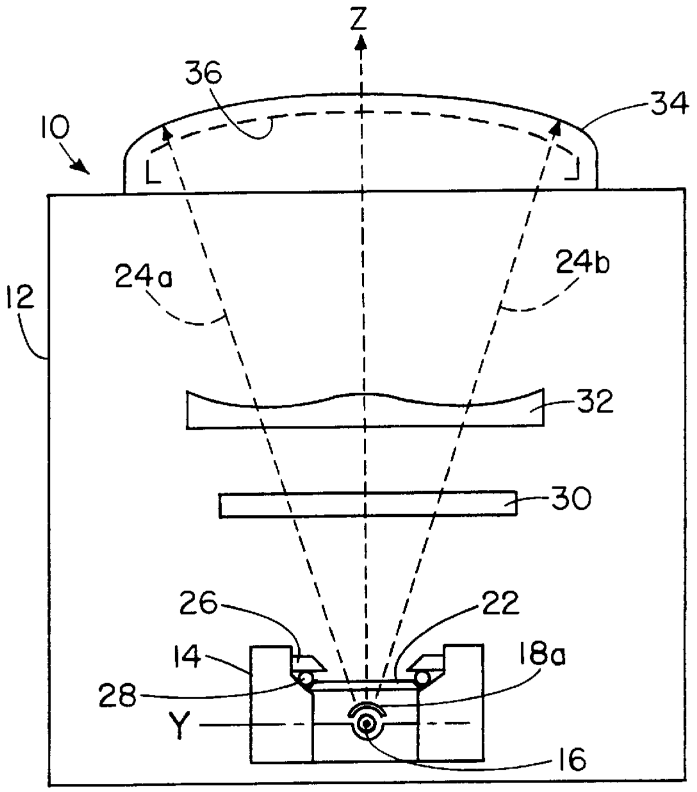
FIG. 1a (PRIOR ART)
FIG. 1*a* is a simplified side elevation view of a typical prior art light source apparatus used in the manufacture of a phosphor dot-bearing display screen for a color CRT.
Figure 1B:
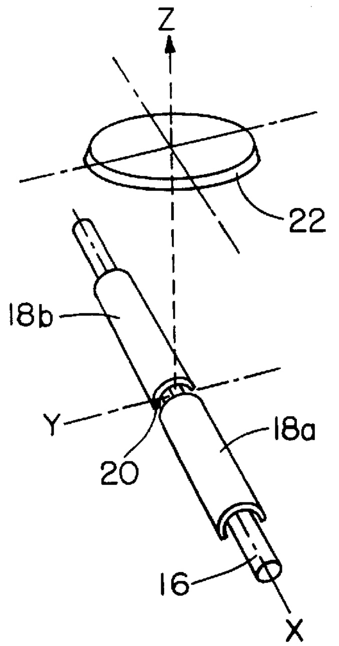
FIG. 1b (PRIOR ART)
FIG. 1*b* is a simplified perspective view of the light source, optical aperture and flat cover glass combination used in the prior art light source apparatus of FIG. 1*a;*
Figure 2A:
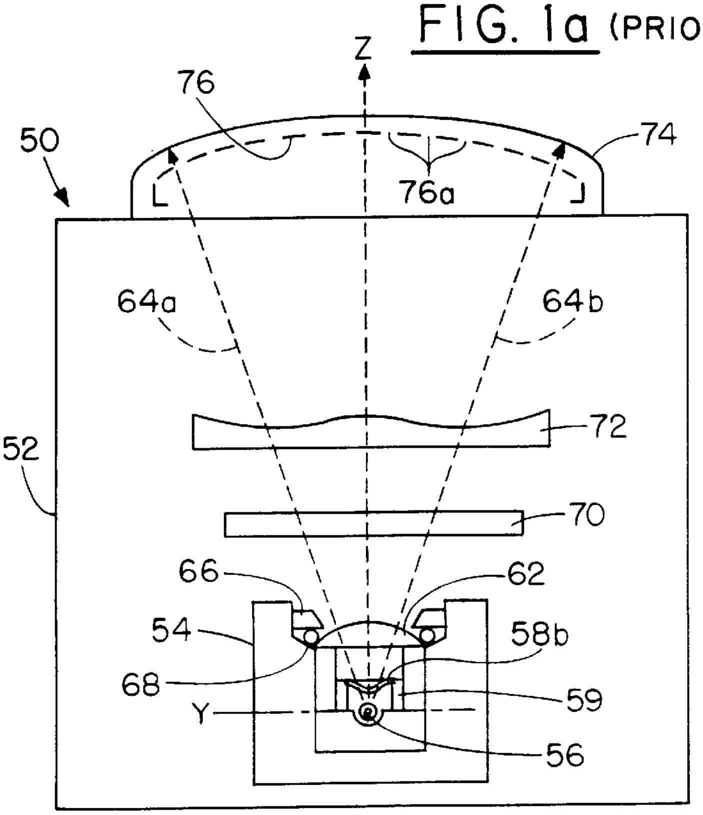
FIG. 2*a* is a simplified side elevation view of a light source apparatus in accordance with the principles of the present invention.
Figure 2B:
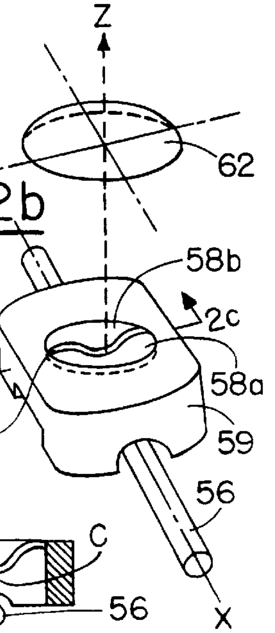
FIG. 2*b* is a simplified perspective view of the light source, optical aperture and plano-convex lens combination used in the light source apparatus of FIG. 2*a;*
Figure 2C:
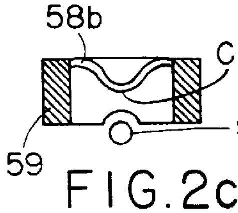
FIG. 2*c* is a sectional view of the support frame and optical aperture combination shown in FIG. 2*b,* taken along site line 2*c*—2*c* therein.

Referring to FIG. 2*a,* there is shown a simplified side elevation view of a light source apparatus 50 in accordance with the principles of the present invention. FIG. 2*b* is a perspective view of the combination of a light source 56, an optical aperture 60 and a plano-convex lens 62 employed in the light source apparatus 50 of FIG. 2*a.* FIG. 2*c* is a sectional view of the optical aperture and its support frame shown in FIG. 2*b* taken along site line 2*c*–2*c* therein.

The light source apparatus 50 includes a housing 52 open at the top. Disposed over the open upper portion of housing 52 is a CRT display screen 74 and its mated shadow mask 76 having a large number of spaced apertures 76*a* therein. Disposed within housing 52 is a lamp house, or holder, 54. Positioned within lamp house 54 is the combination of a light source 56, a support frame 59, an optical aperture 60 and a plano-convex lens 62. Light source 56 is generally cylindrical in shape and is preferably of the high pressure, water cooled mercury lamp type for directing light shown in simplified dotted line form as rays 64*a* and 64*b* through apertures 76*a* within the shadow mask 76 onto the phosphor-bearing inner surface of the CRT's display screen 74. Plano-convex lens 62 is securely maintained in position on an upper portion of lamp house 54 by means of the combination of an O-ring 68 and a generally circular positioning bracket 66. Disposed above the piano-convex lens 62 is the combination of a trimmer 70 and a correction lens 72. First and second curvilinear covers, or shielding, 58*a* and 58*b* are disposed above light source 56 and are secured to an upper portion of support frame 59. First and second covers 58*a* , 58*b* are arranged in a spaced manner so as to define optical aperture 60 therebetween.

As discussed above, in a color CRT having phosphor dots on the inner surface of its display screen, a magnetic deflection yoke deflects the electron beams in a nonlinear manner both horizontally and vertically to provide for convergence of the electron beams and minimize video image distortion. The electron beams are scanned over the CRT's display screen in a raster-like manner. Attempts to optically simulate the nonlinear vertical and horizontal deflection of the electron beams in directing a light beam onto the inner surface of the CRT's display screen in forming electron beam-sensitive phosphor dots have failed. It is important that the phosphor dots closely coincide with the electron beam landing areas to provide a high quality video image. No aspherical lens currently available is capable of providing perfect registration in both the x- and y- directions for aligning the phosphor deposits with the shadow mask apertures so that the electron beams are incident on desired locations on the display screen for optimum video image quality. Expressing the lens surface as h(x,y), the beam landing error in terms of the x- and y-directions is given by the equation for the vector curl as:

$$\frac{\partial}{\partial x}\frac{\partial h(x,y)}{\partial y} \neq \frac{\partial}{\partial y}\frac{\partial h(x,y)}{\partial x} \qquad \text{I}$$

Figure 3:
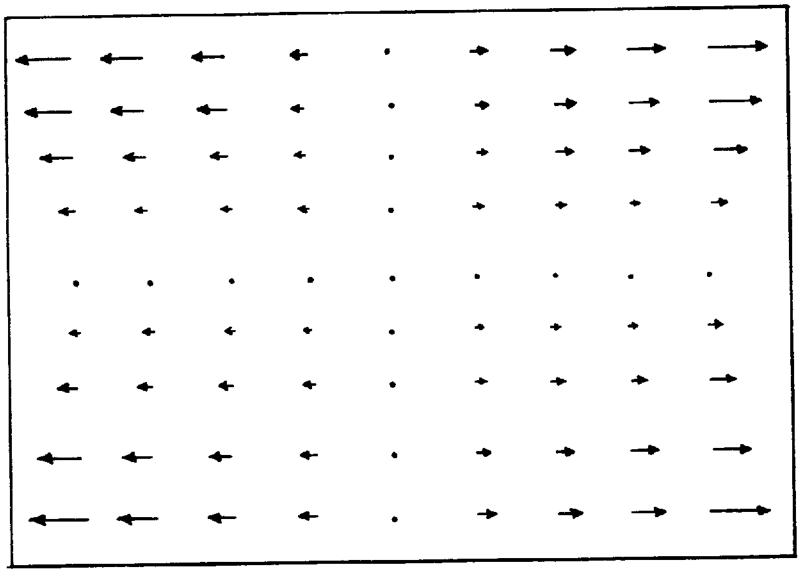
FIG. 3 is a simplified graphic illustration of residual registration errors along the x-direction on a CRT display screen typically encountered in the prior art.

It is possible to design a lens to accommodate the entire range of registration in the x-direction as used in the case of phosphor stripe screen CRTs, with the residual registration error in the y-direction not contributing to a degradation in color purity or white uniformity of the video image. It is also possible to design a lens to accommodate the full range of registration in the y-direction, with only residual registration errors present in the x-direction as shown in FIG. 3. In FIG. 3, the magnitude to each vector, or arrow, represents the extent of residual misregistration in the x-direction.

An optical aperture in accordance with the present invention includes a plurality of inflection points symmetrically disposed along the length of the optical aperture with respect to a point of closest approach of the optical aperture to the light source 56 identified as point C on one of the covers **58*b* in FIG. 2*c***.

The curve mathematically describing the shape of the optical aperture used in the present invention is given by the following expression:

$$A(y) = \sum_{i=0}^{n} a_i y^i,\ 10 \geq n \geq 4, \qquad \text{II}$$

where n=the degree of the polynomial;

$a_i$=an arbitrary constant; and i=a running index.

Figure 5:
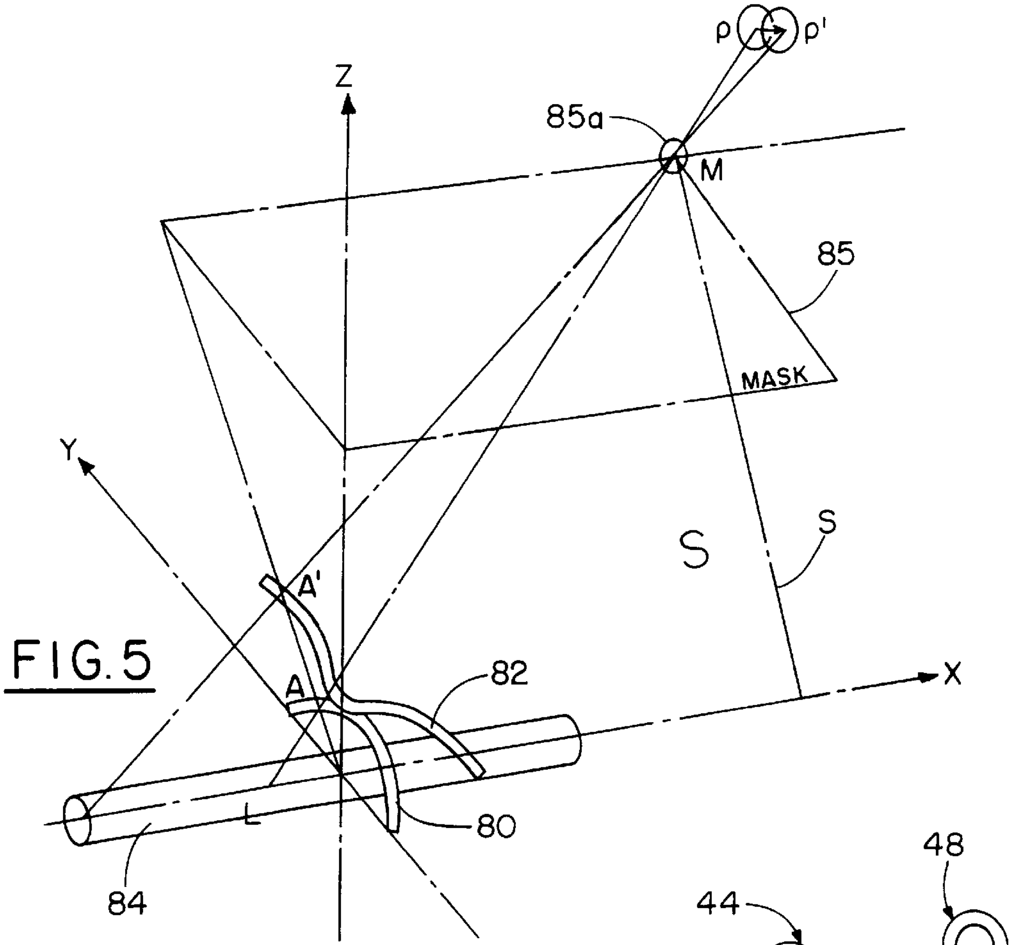
FIG. 5 is a simplified perspective view illustrating a comparison of the residual misregistration of the prior art with that of the inventive light source which essentially eliminates the residual misregistration error.
Figure 6:
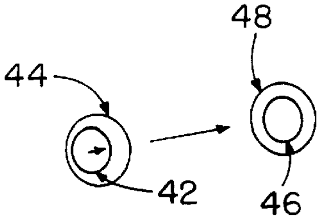
FIG. 6 shows the relative positions of a phosphor deposit and an electron beam landing area in the case of residual misregistration as well as for the case of essentially zero residual misregistration between the phosphor deposit and electron beam landing area.

Referring to FIG. 5, there is shown a simplified comparison in graphical form of light directed from a light source 84 through a prior art optical aperture 80 with light from the same source directed through the optical aperture 82 of the present invention. As shown in the figure, light from light source 84 after passing through one of the optical apertures then transits an aperture **85*a* in the CRT's shadow mask 85. The light is emitted by the light source 84 in the plane designated S with the registration varying in the x-direction on the display panel. If the light source 84 is reoriented on the y-axis and the inventive optical aperture 82 is similarly rotated 90° in the x-y plane, residual misregistration will be corrected for the y-direction. Misregistration in FIG. 5 is represented by the vector extending between points P and P' on the display screen. The improvement in registration is shown in simplified form in FIG. 6, where phosphor dot 42 is not centered on the electron beam footprint 44 in the left hand side of the figure, while the phosphor dot 46 is centered on the electron beam footprint 48** in the right hand side after residual misregistration is corrected for by the present invention.

TABLE I

| AREA | APERTURE SHAPE | CORRECTION PERFORMANCE | RESIDUAL MISREGISTRATION (WORST POINT IN MICRONS) |
|---|---|---|---|
| I | Circular | poor | 2.0 |
| I | V-shaped | worst (too much correction) | 2.5 |
| I | Parabolic | fair | 0.5 |
| I | Inflection Points | best | 0.3 |
| II | Circular | worst | 22.3 |
| II | V-shaped | fair | 2.7 |
| II | Parabolic | poor (not enough correction) | 5.8 |
| II | Inflection Points | best | 0.5 |
| III | Circular | worst | 33.2 |
| III | V-shaped | fair | 2.6 |
| III | Parabolic | poor (too much correction at the edge) | 17.7 |
| III | Inflection Points | best | 0.3 |

Figure 4:
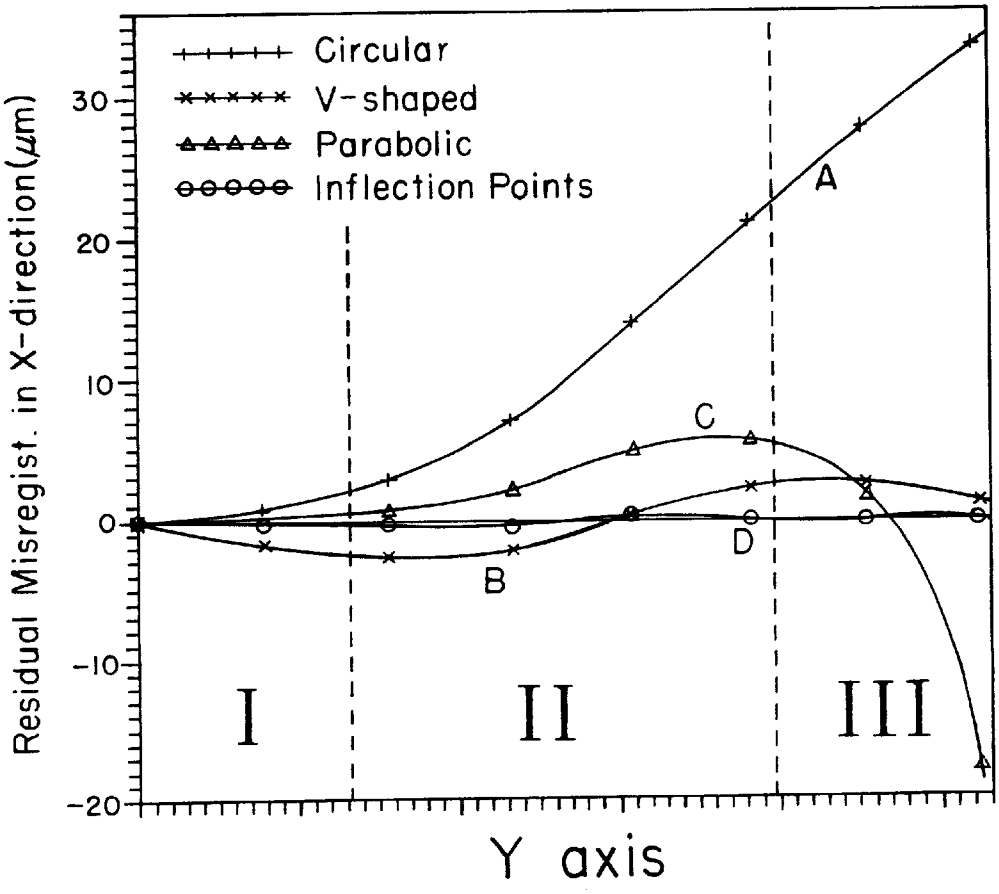
FIG. 4 is a graphic comparison of the x-direction residual misregistration in the first quadrant for a prior art generally circular aperture with that of the present invention for a 15 inch, high resolution color CRT.
Figure 7:
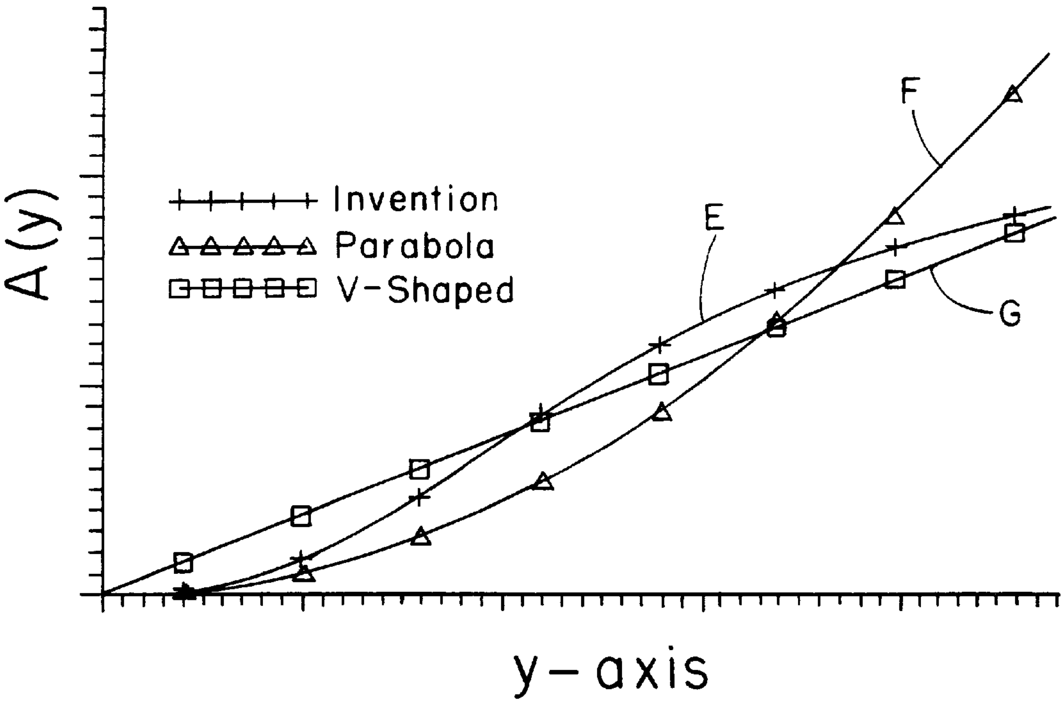
FIG. 7 is a graphic comparison of the shape of the aperture of the present invention with two prior art approaches.

Referring to Table I and FIG. 4, there are shown a comparison of the measured performance of the inventive optical aperture (inflection points) with the prior art generally circular optical aperture as shown in FIGS. **1*a* and 1*b*, as well as with the V-shaped and parabola-shaped optical apertures of the prior art approaches discussed above. FIG. 7 is a graphic comparison of the shape of the inventive optical aperture corresponding to curve E with the shapes of the parabolic optical aperture of curve F and the V-shaped optical aperture of curve G, where the shape of the optical aperture given by the expression for A(y). In Table I and FIG. 4**, area I designates the area near the x-axis on the display panel. Area III represents the area far from the x-axis on an upper or lower edge of the display panel, while area II represents the area on the display panel between the aforementioned areas I and III.

Figure 8:
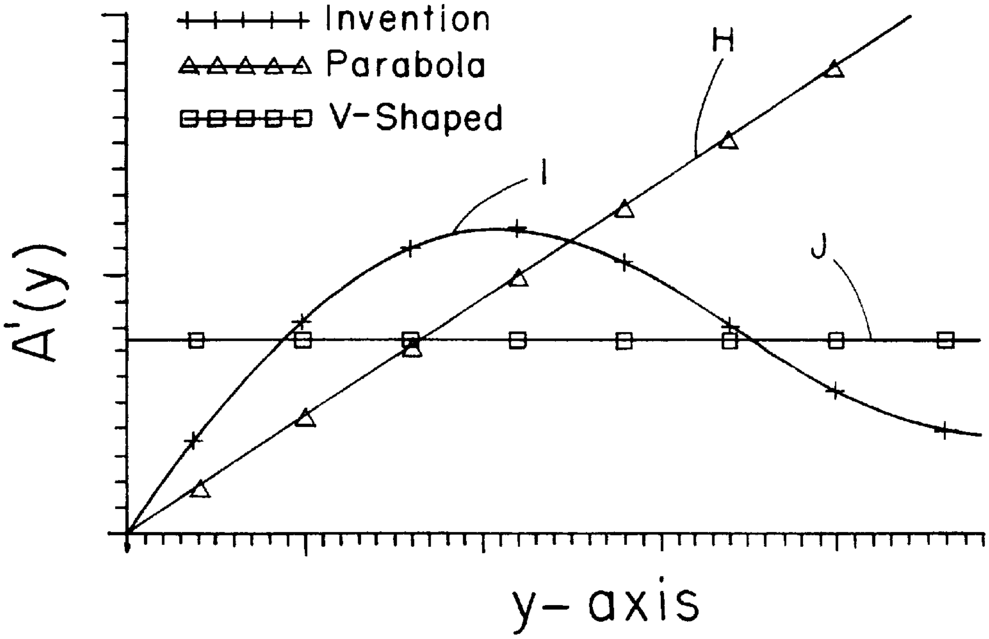
FIG. 8 is a graphic comparison of the registration sensitivity in the y-direction of the light source of the present invention with that of two prior art approaches.

The optical aperture of the present invention having a plurality of inflection points not only provides improved registration between the phosphor dots and shadow mask apertures, but also reduces the registration sensitivity which is a function of precision of mechanical assembly of the light source and associated structure as well as the alignment error. The sensitivity in the y-direction is proportional to the first derivative of A(y), or A'(y), which is the slope of the optical aperture. FIG. 8 is a graphic comparison of the first derivatives of the mathematical expressions describing: (1) the parabolic optical aperture (curve H); (2) the inventive optical aperture with inflection points (curve I); and (3) the V-shaped optical aperture (curve J).

Figure 9:
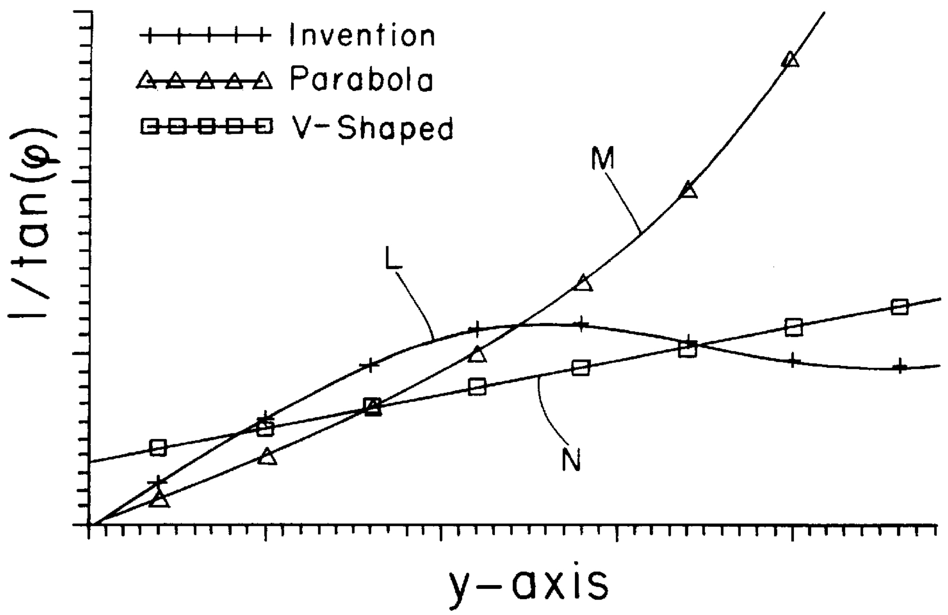
FIG. 9 is a graphic comparison of the sensitivity in the z-direction of the light source of the present invention with that of two prior art approaches.

The sensitivity in the z-direction is proportional to 1/tanΦ, where the angle Φ is the angle between the tangent line on the optical aperture and the surface S which is the surface including the x-axis and the measurement point on the CRT's display panel as previously described and shown in FIG. 5. FIG. 9 is a graphic comparison of z-axis sensitivity for: (1) the inventive optical aperture (curve L); (2) the prior art parabolic optical aperture (curve M); and (3) the prior art V-shaped optical aperture (curve N). The total sensitivity is thus given by the expression $$\int A'(y)dy \qquad \text{III}$$

and the expression $$\int_{\frac{1}{\tan\phi}} dy \qquad \text{IV}$$

for the y- and z- directions, respectively. The inventive optical aperture having points of inflection provides the lowest total sensitivity to light source alignment and mechanical assembly tolerances, particularly at the edge of the CRT display panel where color purity tolerance is the least.

Figure 10:
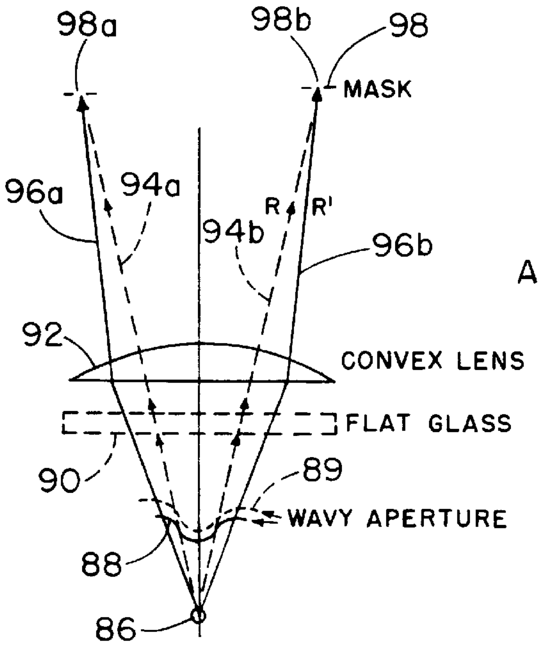
FIG. 10 is a simplified schematic diagram of the optical aperture of the present invention in combination with a plano-convex lens for increasing misregistration correction in accordance with another aspect of the present invention.
Figure 11:
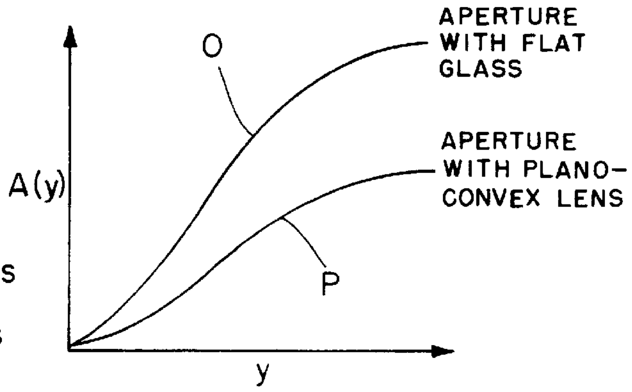
FIG. 11 is a graphic comparison of misregistration correction provided by the present invention with and without the plano-convex lens shown in the arrangement of FIG. 10.

The larger and flatter the display screen such as in a high resolution display CRT, the larger the residual misregistration errors requiring a steeper optical curve with inflection points in accordance with the present invention, or a curve having increased slope as shown for the case of optical aperture 89 shown in dotted line form in FIG. 10. Incorporation of a plano-convex lens 92 in the inventive arrangement as shown in FIG. 10 increases the misregistration correction capability of the inventive optical aperture 88 allowing light source 86 to direct light in the form of rays 96*a* and 96*b* (shown in solid line form) through end portions of a flatter form of the inventive optical aperture 88 having reduced slope, as well as through the plano-convex lens 92 and respective apertures 98*a* and 98*b* in the CRT's shadow mask 98. In FIG. 10, uncorrected rays 94*a* and 94*b* (shown in dotted line form) are directed through the inventive optical aperture 89 and then through a flat glass element 90 (also shown in dotted line form). From the figure, it can be seen that by incorporating the piano-convex lens 92 in the optical arrangement, the slope of the optical aperture 88 may be reduced and the optical aperture may become generally flatter. Reducing the slope of the inventive optical aperture 88 makes it easier to maintain a high quality of color purity for the video image during the manufacturing process. FIG. 11 is a graphic comparison of the equations, or shapes, of an optical aperture in accordance with the present invention used just with the flat glass element and without the plano-convex lens as shown in curve O, and with a plano-convex lens as shown in curve P. From these curves, it can be seen that inclusion of the plano-convex lens in the optical light source combination allows the slope of the inventive optical aperture to be reduced.

Figure 12:
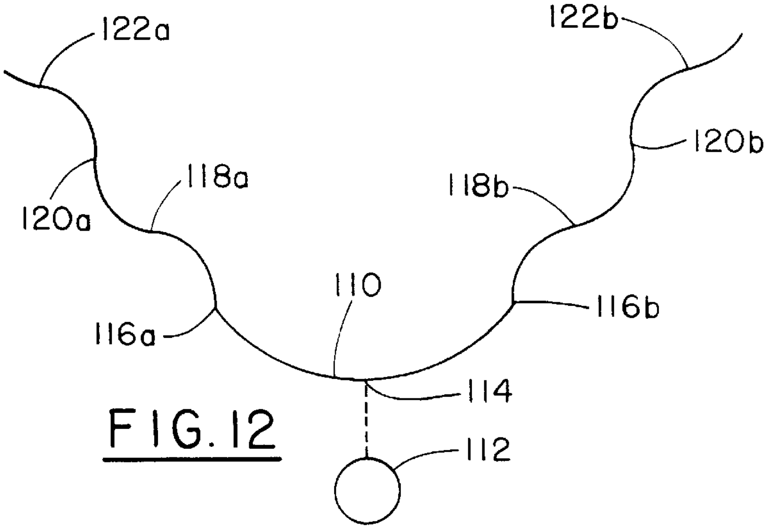
FIG. 12 is a simplified diagram of an optical aperture for a light source used in the manufacture of a color CRT showing the optical aperture with a plurality of inflection points in accordance with the present invention.

FIG. 12 is a simplified illustration of an optical aperture 110 disposed adjacent a light source 112 and having a plurality of inflection points along its length. The inflection points are arranged in pairs, with each pair of inflection points arranged symmetrically with respect to a point 114 of closest approach of the aperture to the light source 112. An optical aperture 110 in accordance with the present invention may have between 2 and 8 inflection points along its length which are shown as paired inflection points 116*a* and 116*b*, 118*a* and 118*b*, 120*a* and 120*b*, and 122*a* and 122*b*.

There has thus been shown a light source for use in color CRT display screen manufacture which employs an elongated light aperture having a plurality of inflection points disposed along its length. The optical aperture is positioned between a light source such as a mercury lamp and the CRT's display screen for directing light through apertures in the display screen's mated shadow mask in a manner which closely approximates the trajectories of electron beams deflected across the display screen by the CRT's magnetic deflection yoke. By directing the light along paths closely approaching the trajectories of electron beams which pass through the shadow mask apertures, phosphor dots activated by the incident light are formed in precise registration with the beam passing apertures in the CRT's shadow mask to provide a high degree of color purity and white uniformity in a video image presented on the display screen. The unique shape of the optical aperture with inflection points also reduces registration sensitivity of the light beam directed onto the glass display screen, thus relaxing the alignment and assembly precision of the light source and associated components.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for forming a matrix of phosphor elements on an inner surface of a display screen of a color cathode ray tube (CRT) having an apertured color selection electrode in spaced relation to said display screen, wherein a light sensitive material containing phosphor is disposed on the inner surface of said display screen, said apparatus comprising:

an elongated, linear light source; and an apertured member having an elongated, curvilinear optical aperture with a longitudinal axis aligned generally transverse to said elongated, linear light source and disposed intermediate said light source and the display screen for directing light from said light source through apertures in the color selection electrode onto the light sensitive material on the display screen's inner surface, wherein said optical aperture has a plurality of inflection points disposed in a spaced manner along its length and wherein said inflection points are symmetrically disposed on either side of a point of closest approach of said optical aperture to said light source, with each inflection point defining a reversal in slope of said optical aperture.

2. The apparatus of claim 1 wherein said optical aperture includes from two (2) to eight (8) inflection points along its length.

3. The apparatus of claim 1 wherein said curvilinear optical aperture is formed by and disposed intermediate first and second spaced curvilinear cover members.

4. The apparatus of claim 1 further comprising a plano-convex lens disposed intermediate said optical aperture and the display screen to permit the curvature of said optical aperture to be reduced.

5. Apparatus for directing a light beam through apertures in a color selection electrode onto an inner surface of a cathode ray tube (CRT) display screen having a light sensitive material thereon for forming a plurality of spaced electron beam sensitive elements on the inner surface of said CRT display screen, said apparatus comprising:

an elongated, generally linear light source;

a support frame; and first and second curvilinear shielding means arranged in a spaced manner from each other and attached to said support frame and disposed between said light source and the color selection electrode and CRT display screen for defining an optical aperture, wherein light emitted by said light source transits said optical aperture and the apertures in the color selection electrode and is incident upon the inner surface of the CRT display screen, and wherein said optical aperture is elongated and aligned generally transverse to said elongated, generally linear light source and is curvilinear having a plurality of spaced inflection points along its length, wherein a slope of said optical aperture reverses at each of said inflection points for directing the light onto the inner surface of the CRT display screen.

* * * * *